United States Patent Office 3,562,226
Patented Feb. 9, 1971

3,562,226
FRICTION REDUCING
Owen C. Gayley, Coraopolis, M. Frederick Hoover, Bethel Park, and Leonard J. Persinski, Pittsburgh, Pa., assignors, by mesne assignments, to Calgon Corporation, a corporation of Delaware
No Drawing. Continuation of abandoned application Ser. No. 595,620, Nov. 21, 1966. This application Aug. 13, 1969, Ser. No. 854,016
Int. Cl. C08f 15/00, 15/40
U.S. Cl. 260—80.3  5 Claims

ABSTRACT OF THE DISCLOSURE

Reduction of friction loss in oil well fracturing is accomplished through the addition of small amounts of copolymers of acrylamide and dimethyl diallyl ammonium chloride or other diallyl ammonium compounds, with and without crosslinking by N, N' methylene bisacrylamide.

---

This is a continuation of application Ser. No. 595,620, filed Nov. 21, 1966, and now abandoned.

This invention relates to the art of reducing energy loss during the flow of fluids through pipes, which by common usage in oilfield terminology has become known as "friction reduction." Our invention is particularly directed to friction reduction in brines and fresh water used in fracturing operations.

Such polymers as sodium polystyrene sulfonate, polyethylene oxide and polyacrylamide have been proposed for friction reduction in oilfield usage. See U.S. Pats. 3,023,760; 3,254,719 and 3,102,548 as examples. See also, "Studies of the Reduction of Pipe Friction with the Non-Newtonian Additive CMC," by Riphen and Pelch, a Department of Commerce publication dated April 1963.

Although polyacrylamide has proven satisfactory for many oilfield installations, there are many others in which it and other polymers of acrylamide are unsatisfactory because of environmental factors such as high cation content of the fracturing medium or other aqueous fluid to be pumped. Polyacrylamide is generally incompatible with significant quantities of cations. In the presence of oilfield brines of the type sometimes used in fracturing operations, which frequently contain total dissolved solids in the range of up to 300,000 p.p.m., they become insolubilized. Shear stability is also greatly reduced. Particularly difficult are brines having alkaline earth metal contents of more than 1000 p.p.m. It is not uncommon for an oilfield brine useful as a fracturing medium to contain at least 5000 parts per million of calcium.

Throughout this specification, when we speak of "brine stability," we mean the property of remaining effective as a friction reducer in media containing at least 2% total dissolved solids, of which at least 5000 p.p.m. are polyvalent cations. However, our invention is useful not only in brines but in any aqueous fracturing medium.

Our brine stable polymers are copolymers of 99.9% to about 50% by weight acrylamide and the balance derived from monomers of the formula

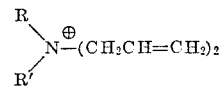

wherein R and R' are independently selected from the group consisting of alkyl groups having one to four carbon atoms,

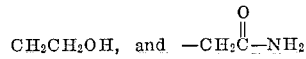

The anion of the quaternary monomer is preferably chloride. Some copolymers falling within this description and methods of making them are disclosed in Schuller & Thomas U.S. Pat. 2,923,701. A preferred composition is a terpolymer including as a third component about 0.001 to 0.006 weight percent of N, N'-methylene bisacrylamide.

The polyelectrolytes may be made by conventional redox catalyst systems in solutions of 5–20% by weight of total monomer and may be recovered by various means known in the art such as drum drying. Preferably, they will be hydrolyzed to the extent of 0.40% of the amide groups in the polymer. After drying, they are fully water-soluble and may be fed directly to the fracturing medium or other aqueous medium. They may of course be used without having been dried.

A preferred polymer is made from a monomer mixture which consists essentially of about 90% acrylamide, about 0.001% to about 0.006% N, N'-methylene bisacrylamide, and the balance dimethyl diallyl ammonium chloride.

To demonstrate the effectiveness of our invention, we utilized a laboratory "friction loop" in which a test fluid is circulated through a pipe having an internal diameter of about 0.25". Pressure measurements were made at points about 5 feet apart. In a 2% CaCl$_2$ brine various concentrations of polymers within our invention were added and the friction reduction results were noted. In Table I, high molecular weight polymers were used having weight ratios of acrylamide to diallyl dimethyl ammonium chloride of 50/50, 75/25, 85/15 and 90/10. These in turn were either unhydrolyzed or hydrolyzed 15%. In the table, the notation 50/50 means a copolymer having even eight proportions of acrylamide and dimethyl diallyl ammonium chloride. 85/15 means 85 weight percent acrylamide and 15 percent dimethyl diallyl ammonium chloride; 90/10 means a ratio of acrylamide to dimethyl diallyl ammonium chloride of 90 to 10. The terms "0% hydr." and "15% hydr." refer to the percentage of the number of amide groups which were hydrolyzed. The notation 75/25 means 75% acrylamide and 25% dimethyl diallyl ammonium monomer. In each case, 120 ml. of a 2% solution was introduced into the loop containing 10 liters of the previously described brine. Results in the tables are given in terms of the precent reduction of friction.

TABLE I

| Polymer | Maximum friction reduction | F/R at X minutes | | | | | |
|---|---|---|---|---|---|---|---|
| | | 5 min. | 10 min. | 15 min. | 20 min. | 25 min. | 30 min. |
| 50/50, 0% hydr | 58.4 at 30 seconds | 45.0 | 38.5 | | | | |
| 50/50, 15% hydr | 52.2 at 30 seconds | 41.0 | 35.5 | 32.5 | 30.3 | 29.2 | |
| 50/50, 15% hydr | 55.4 at 30 seconds | 47.0 | 43.1 | 40.8 | 39.0 | 37.8 | 36.6 |
| 75/25, 0% hydr | 68.2 at 30 seconds | 66.7 | 62.0 | | | | |
| 75/25, 15% hydr | 59.3 at 30 seconds | 56.0 | 54.0 | 52.0 | 51.6 | 49.4 | |
| 85/15, 0% hydr | 65.5 at 0 seconds | 64.0 | 58.4 | 54.7 | 52.7 | 51.0 | 50.0 |
| 90/10, 0% hydr | 67.0 at 0 seconds | 62.5 | 58.1 | 55.6 | 53.4 | | |
| 90/10, 5% hydr | 49.6 at 0 seconds | 47.9 | 46.0 | 44.7 | 43.5 | 42.5 | 41.6 |

We have also found that as much as 0.006 weight percent of N, N'-methylene bisacrylamide may be added to a monomer mix to prepare copolymers otherwise within the descriptions previously disclosed. We prefer not to use more than about .006% N, N'-bisacrylamide.

A series of tests was run on two crosslinked polymers of differing diallyl dimethyl ammonium content. Polymer A was made from a monomer batch mix of about 98.5% (by weight) acrylamide and about 1.5% dimethyl diallyl ammonium chloride, to which was added 0.004% N, N'-methylene bisacrylamide; Polymer B consisted of about 95.0% acrylamide and about 5.0% dimethyl diallyl ammonium chloride to which was added 0.004% N, N'-methylene bisacrylamide. They were hydrolyzed to the various degrees shown in Tables II and III and tested in the friction loop in the various media indicated in the tables with the results shown.

TABLE II
[Friction reduction of 240 p.p.m. solution of Polymer A]

| Fluid | Percent hydrolysis | Maximum F/R | F/R at 5 min. | F/R at 10 min. | F/R at 15 min. |
|---|---|---|---|---|---|
| Tap water | (1) | 66.8 | 64.5 | 60.5 | 57.0 |
|  | 27 | 71.5 | 71.0 | 71.0 |  |
|  | 32 | 69.0 | 68.0 | 68.5 | 69.0 |
|  | 36 | 73.0 | 71.5 | 71.0 | 69.5 |
| 2% CaCl₂ | (1) | 66.2 | 64.8 | 61.0 | 57.0 |
|  | 27 | 69.0 | 59.0 |  |  |
|  | 32 | 68.4 | 54.0 |  |  |
|  | 36 | 62.7 | 42.0 | 32.0 |  |
| 10% NaCl | (1) | 67.4 | 66.4 | 63.4 | 59.0 |
|  | 27 | 70.3 | 68.5 | 65.6 | 60.0 |
|  | 32 | 72.1 | 70.0 | 64.0 | 54.3 |
|  | 36 | 71.5 | 70.0 | 68.0 | 63.5 |

¹ Base.

TABLE III
[Friction reduction of 240 p.p.m. solution of Polymer B]

| Fluid | Percent hydrolysis | Maximum F/R | F/R at 5 min. | F/R at 10 min. | F/R at 15 min. |
|---|---|---|---|---|---|
| Tap water | (1) | 66.0 | 61.8 | 55.8 |  |
|  | 19 | 72.0 | 70.7 | 71.0 | 69.9 |
|  | 44 | 72.5 | 70.9 | 69.9 | 68.0 |
| 2% CaCl | (1) | 68.1 | 63.0 | 56.4 | 52.2 |
|  | 19 | 67.9 | 54.1 | 46.6 |  |
|  | 44 | 67.0 | 60.4 | 54.0 |  |
| 10% NaCl | (1) | 68.8 | 65.1 | 69.2 | 54.2 |
|  | 19 | 71.0 | 68.8 | 65.8 | 61.4 |
|  | 44 | 69.5 | 67.4 | 63.4 | 59.0 |

¹ Base.

It is apparent from the above presented data that our polymers are effective to different degrees with and without hydroylsis. However, we prefer to use polymers having about 10 to about 40% of the amide groups hydrolyzed. The friction reducing polymers are normally used in amounts from about 100 p.p.m. to 500 p.p.m., but 1000 p.p.m. or over may be used without significant losses in efficiency due to viscosity. There appears to be no minimum concentration below which they are completely without effect; a very small amount is effective to a very slight degree. The cross-linking effected by a concentration of from 0.002% to 0.006% N,N'-methylene bisacrylamide is desirable because it increases the apparent chain length of the polymer without sacrificing solubility. Concentrations above 0.006%, when fully incorporated into the polymer, will tend to cause gelling. Concentrations below 0.002% are useful but do not cause a significant change over the corresponding uncrosslinked polymer.

We do not intend to be limited to the particular examples and illustrations described above. Our invention may be otherwise practiced within the scope of the following claims:

We claim:
1. Method of reducing friction loss due to turbulent flow of aqueous fracturing fluid in an oilfield fracturing process comprising adding to said fracturing fluid a random, addition, water-soluble copolymer of (a) acrylamide, (b) a monomer of the formula

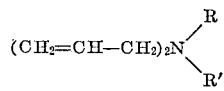

where R and R' are independently selected from the group consisting of alkyl groups having one to four carbon atoms, $CH_2CH_2OH$, and

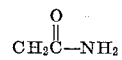

and (c) up to about 0.006 weight percent of N,N'-methylene bisacrylamide, wherein the weight ratio of acrylamide to monomer of the formula

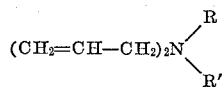

is from about 1:1 to about 99.9:0.1, in an amount sufficient to reduce friction loss.

2. Method of claim 1 in which the diallyl monomer is dimethyl diallyl ammonium chloride.

3. Method of claim 1 in which the amide groups in the polymer are hydroylzed from 10 to 40%.

4. In the process of fracturing an earth formation penetrated by a well, wherein an aqueous fracturing fluid is injected through the well into the earth formation at a high velocity to cause fracturing of the formation, the improvement of decreasing the friction loss in the flow of the aqueous fracturing fluid which comprises adding to the fracturing fluid 0.005 to 0.5 weight percent of a random, addition, water-soluble copolymer made from a monomer mix consisting essentially of, by weight, (a) at least 50% acrylamide, (b) up to about 0.006% N,N'-methylene bisacrylamide, and (c) at least 0.1% dimethyl diallyl ammonium chloride, and injecting the resulting mixture in the well.

5. A random, cross-linked, addition, water-soluble polymer made from the vinyl polymerization of, by weight, (a) at least 50% acrylamide, (b) from 0.002% to about 0.006% N,N'-methylene bisacrylamide, and (c) at least 0.1% dimethyl diallyl ammonium chloride.

References Cited

UNITED STATES PATENTS 2,923,701   2/1960   Schuller et al.
3,147,218   9/1964   Booth et al.
3,252,904   5/1966   Carpenter.

JOSEPH L. SCHOFER, Primary Examiner
S. M. LEVIN, Assistant Examiner

U.S. Cl. X.R.
260—29.6, 80.73; 252—8.55; 175—65

UNITED STATES PATENT OFFICE
CERTIFICATE OF CORRECTION

Patent No. 3,562,226  Dated February 9, 1971

Inventor(s) Owen C. Gayley et al.

It is certified that error appears in the above-identified patent and that said Letters Patent are hereby corrected as shown below:

Column 3, line 5, before "bisacrylamide" insert -- methylene --.

Signed and sealed this 23rd day of May 1972.

(SEAL)
Attest:

EDWARD M. FLETCHER, JR.
Attesting Officer

ROBERT GOTTSCHALK
Commissioner of Patent